United States Patent
Merten et al.

(10) Patent No.: US 6,612,424 B2
(45) Date of Patent: Sep. 2, 2003

(54) DRIVE SHAFT FOR SCRAPER CHAIN CONVEYORS FOR DOUBLE INBOARD AND DOUBLE OUTER CHAIN CONVEYOR BELTS

(75) Inventors: Gerhard Merten, Lunen (DE); Adam Klabisch, Dortmund (DE)

(73) Assignee: DBT GmbH (DE)

( * ) Notice: Subject to any disclaimer, the term of this patent is extended or adjusted under 35 U.S.C. 154(b) by 0 days.

(21) Appl. No.: 09/934,802

(22) Filed: Aug. 22, 2001

(65) Prior Publication Data
US 2002/0050441 A1 May 2, 2002

(30) Foreign Application Priority Data
Aug. 28, 2000 (DE) ......................... 200 14 854
Aug. 28, 2000 (DE) ......................... 200 14 864

(51) Int. Cl.⁷ .............................. B65G 23/02
(52) U.S. Cl. ................ 198/835; 198/834; 198/837; 474/164
(58) Field of Search ................ 198/835, 834, 198/837; 474/164

(56) References Cited

U.S. PATENT DOCUMENTS

| | | | |
|---|---|---|---|
| 2,965,217 A | * 12/1960 | Dommann et al. | 198/864 |
| 3,805,631 A | * 4/1974 | Kerklies | 74/243 |
| 3,946,859 A | * 3/1976 | Jeffrey et al. | 198/203 |
| 3,971,147 A | * 7/1976 | Hyler | 198/203 |
| 4,008,502 A | * 2/1977 | Crane et al. | 198/624 |
| 4,037,713 A | * 7/1977 | Soliman et al. | 198/834 |
| 4,131,420 A | * 12/1978 | Miller | 198/791 |
| 4,221,532 A | * 9/1980 | Vance | 198/486 |
| 4,437,564 A | * 3/1984 | Redder et al. | 198/834 |
| 4,482,039 A | * 11/1984 | Harris | 192/67 R |
| 4,634,412 A | * 1/1987 | Satake | 474/253 |
| 5,558,206 A | * 9/1996 | Helgerson et al. | 198/781.04 |
| 5,913,403 A | * 6/1999 | Merten et al. | 198/834 |
| 5,927,479 A | * 7/1999 | Merten et al. | 198/834 |
| 6,227,354 B1 | * 5/2001 | Howden et al. | 198/834 |
| 6,279,734 B1 | * 8/2001 | Meya et al. | 198/834 |

* cited by examiner

Primary Examiner—Douglas Hess
(74) Attorney, Agent, or Firm—Cook, Alex, McFarron, Manzo, Cummings & Mehler, Ltd.

(57) ABSTRACT

A drive shaft (5) with at least one chain wheel (7) for the drive of chain scraper conveyors, especially for underground mining operations, with a full-width drive shaft (5) mounted on both ends in bearings (4) on the machine frame (1), which has outer gearing teeth (6) for the positive rotational engagement with single part chain wheels (7), which can be pulled off the drive shaft (5), whereby the drive shaft (5) has outer teeth (6) along its longitudinal region, in which a through central gearing (6) reaches to the reduced diameters (17) of the drive shaft (5) in the proximity of the bearing housings (3).

14 Claims, 2 Drawing Sheets

Figure 1:
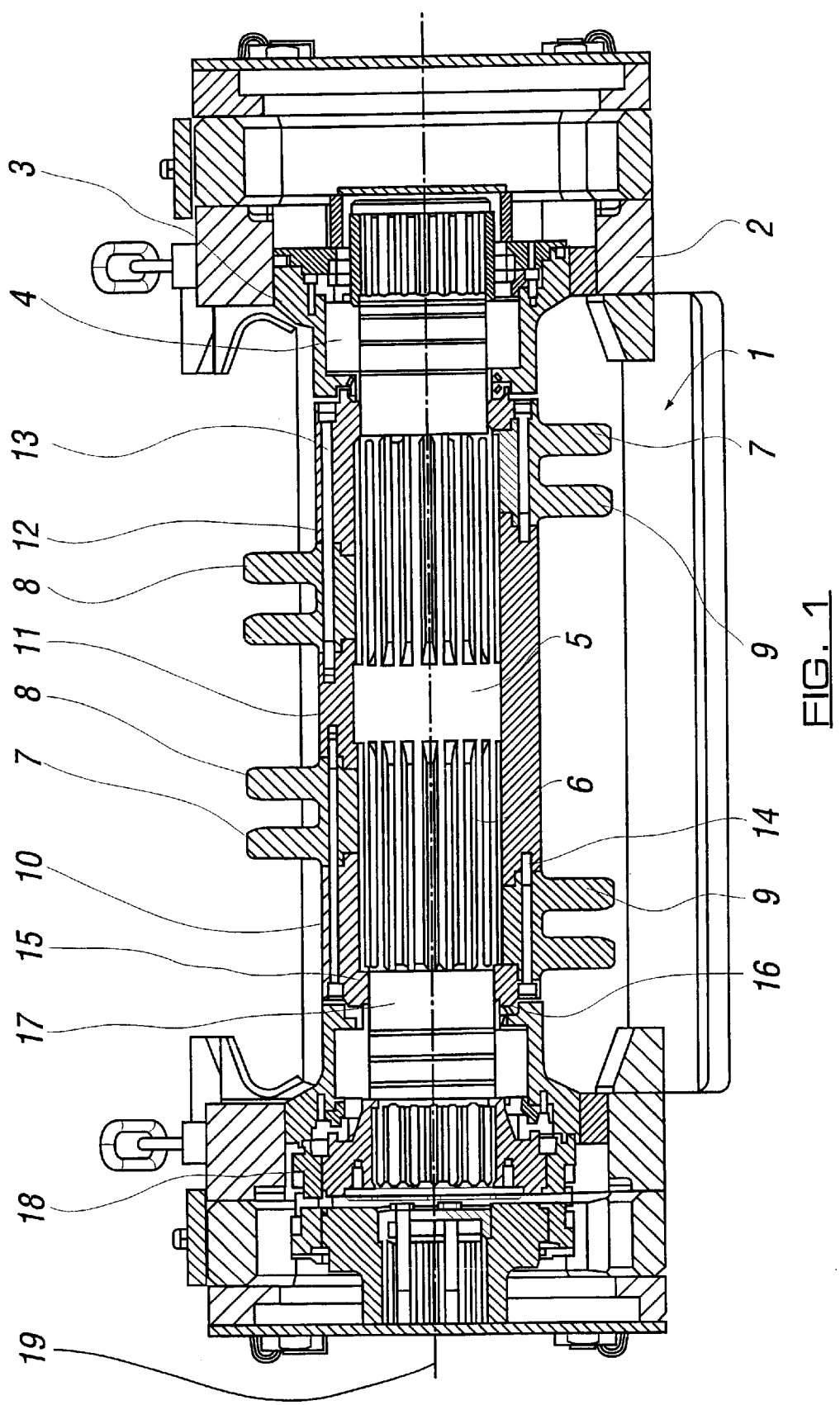

DRIVE SHAFT FOR SCRAPER CHAIN CONVEYORS FOR DOUBLE INBOARD AND DOUBLE OUTER CHAIN CONVEYOR BELTS

The present invention relates to a drive shaft with at least one chain wheel for the drive of scraper chain conveyors, especially for underground mining operations with a through drive shaft mounted in bearings on both sides of the maching frame, which has outer gearing teeth for the positive rotational engagement of single part chain wheels, which can be removed from the drive shaft, whereby the drive shaft has outer toothed gearing along its longitudinal region.

A chain drum arrangement of this construction was previously proposed in DE 2709414 C2 and has the disadvantage that gearing teeth must always be provided on the drive shaft for the outer chain wheels and for the double inboard chain wheel. Furthermore different chain wheels are necessary.

It is an aim of the present invention to simplify both the manufacture of drive shafts and also of chain wheels as well as the stocking of chain wheels.

Accordingly a first aspect of the present invention is directed to a drive shaft as described in the opening paragraph of the present specification in which a drive shaft with at least one chain wheel for the drive of scraper chain conveyors, especially for underground mining operations with a through drive shaft mounted in bearings on both sides of the maching frame, which has outer gearing teeth for the positive rotational engagement of single part chain wheels, which can be removed from the drive shaft, whereby the drive shaft has outer toothed gearing along its longitudinal region.

The advantage of this aspect of the present invention is in that the drive shaft is provided with only one continuous outer toothed section and that onto this can be mounted both the similar chain wheels for the double inboard chain belt and also for the double outer chain belt and only in the case of very closely adjacent double inboard chain belts does a different single part chain wheel have to be applied.

Accordingly a second aspect of the present invention is directed to a drive shaft as described in the opening paragraph of the present specification, in which two central toothed gearing sections extend either side of the vertical conveyor centre line such that both the chain wheels of the double inboard chain conveyor belt and also the chain wheels of the double outer chain conveyor belt can be positioned on this toothing.

The advantage of this aspect of the present invention is that the drive shaft provided with only two outer toothed sections and that onto these can be mounted both the similar chain wheels for the double inboard chain belt and also for the double outer chain belt.

Advantageously the chain wheel of the double inboard chain conveyor belt comprises two identical chain wheels.

Preferably the chain wheels of the double outer chain conveyor belt correspond to the chain wheels of the double inboard chain conveyor belt.

In a preferred embodiment the chain wheels are set to the prescribed separation distance for the double inboard chain conveyor belt or the double outer chain conveyor belt by means of distance sleeves.

Advantageously the distance sleeves comprise a central sleeve and two outer sleeves.

Preferably the chain wheels and the outer sleeves are provided with axial borings and the central sleeve with corresponding threaded blind hole borings.

In a preferred embodiment the outer sleeves have a radial distance collar in their region near to the conveyor on the inside.

Advantageously the outer sleeves have a circulating recess in their region near to the conveyor on the inside.

Preferably the drive shaft has a reduced diameter in the region close to the bearing in each case.

In a preferred embodiment the drive shaft is connected on its drive side with a curved tooth coupling.

Advantageously the chain wheel of the double inboard chain conveyor belt comprises a single part chain wheel.

Preferably the chain wheel is fixed axially by two outer sleeves.

Figure 2:
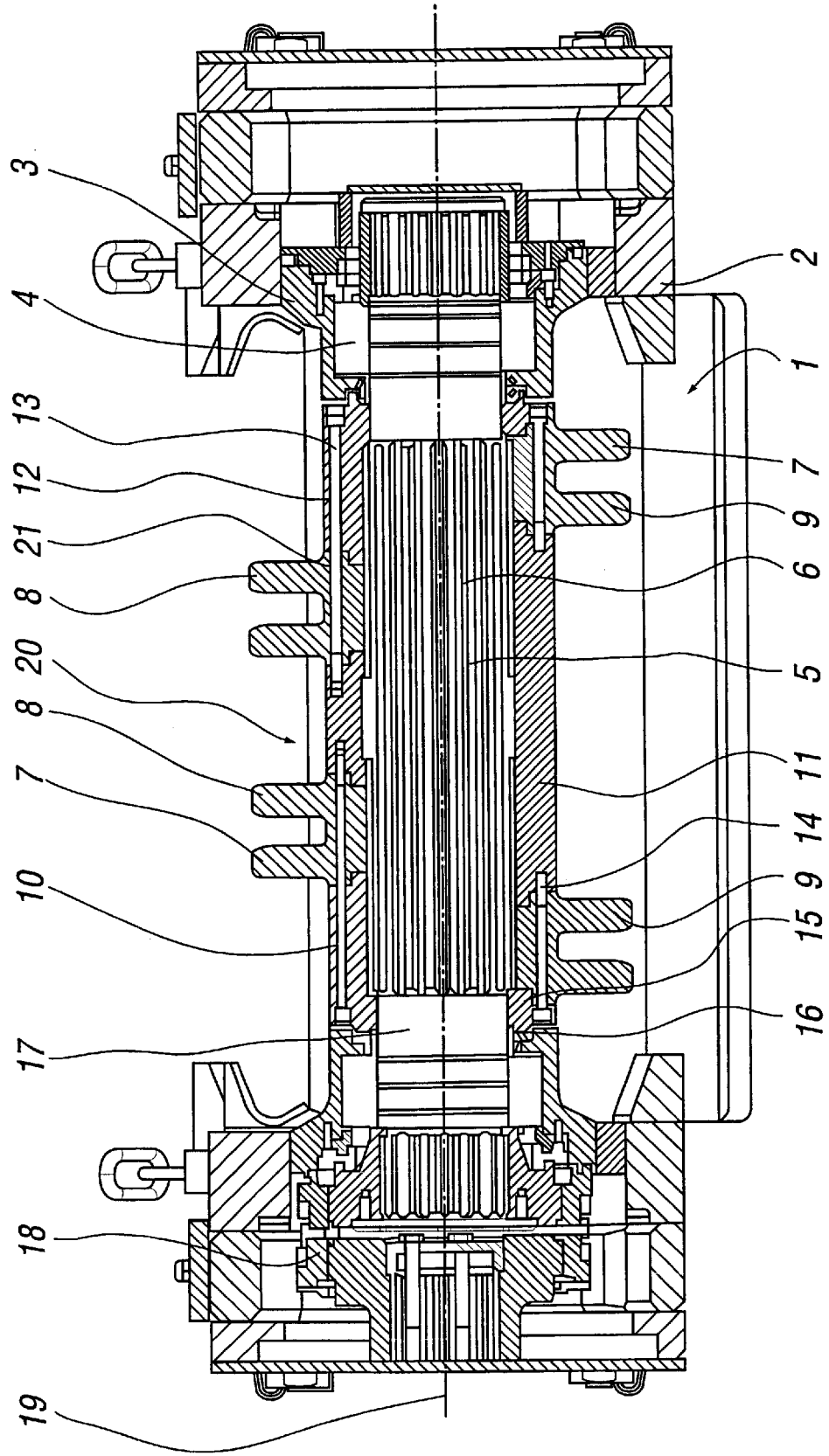

Examples of drive shafts with chain wheels made in accordance with the present invention are more clearly explained herein below with reference to the accompanying drawings, in which:

FIG. 1 shows a cross-sectional view in the upper half of the Figure of a drive shaft with a double inboard chain wheel pair and in the lower half of the Figure of a double outer chain wheel pair; and FIG. 2 shows a cross-sectional view of a modified drive shaft in the same views as FIG. 1.

In FIG. 1 a machine frame 1, not shown in detail, of a chain scraper conveyor is equipped with parallel and vertical side cheeks 2, in which bearing housings 3 with bearings 4 and a drive shaft 5 are mounted. The drive shaft 5 is equipped with two eccentric toothed sections 6 onto which the chain wheels 7 are pressed.

Two possibilities exist for the assembly of the drive shaft:

Firstly the drive shaft 5 can be pre-assembled into the head, that is that the side cheeks 2 of the machine frame 1 are opened in front of the head and the complete, pre-assembled drive shaft 5 can be pushed in. For this the drive 19 with its curved tooth coupling 18 must be separated from the side cheek 2 of the machine frame 1 and similarly the closure in front of the head on the machine frame 1. A middle sleeve 11 is pushed onto the drive shaft 5 and the two chain wheels 7 are pressed onto the drive shaft 5 from the left and right-hand sides respectively. Thereafter the outer sleeves 10 are pushed onto the drive shaft 5. Then screws 13 are inserted through the axial borings 12, of the outer sleeves 10 and the chain and are screwed into tapped blind hole borings 14. Since the end region of the drive shaft 5 has a reduced diameter 17 and the outer sleeves 10 have a distance collar 15, the position of the chain wheels 7 is established by the tightening of the screws 13. In the region close to the conveying direction side the outer sleeves 10 have a circulating recess 16, which works together with a cut-out on the bearing housing 3 and thereby forms a protective drive shaft for the bearing seal.

Secondly if pre assembly of the drive shaft 5 into the head is not provided, the assembly proceeds as follows. The drive 19 and the curved tooth coupling 18 are released from the side cheek 2 of the machine frame 1. The drive shaft 5 is guided through the opening in the side cheek 2 in the machine frame 1. The centre sleeve 11 is then pushed on and thereafter the two chain wheels 7, then the two outer sleeves 10 and thereafter the two outer sleeves 10 and then the chain wheels 7 are tightened onto the drive shaft 5 in their prescribed positions using the screws 13. Then the two bearing housings 3 with their bearings 4 are pressed onto the reduced diameter 17 of the drive shaft 5. The drive shaft 5, thus completed, is is pushed until the bearing housings 3 have taken up their prescribed positions in the side cheeks 2 of the machine frame 1. The drive 19 with the curved tooth coupling 18 is then flange mounted on the side cheek 2. Disassembly is effected in the reverse sequence.

FIG. 2 shows a modified machine frame 1. The same reference numerals are used to denote the same parts. The drive shaft 5 is equipped with a continuous toothed section 6 onto which the chain wheels 7 are pressed.

If double inboard chain belts 8 lie very close alongside each other, it can be necessary to provide a single part centre chain wheel 20 for this. In this case the centre sleeve 11 is omitted and blind hole borings 21 are correspondingly inserted in the single part chain wheel.

What is claimed is:

1. A drive shaft with at least one chain wheel for the drive of scraper chain conveyors, for underground mining operations, with a through drive shaft mounted in bearings on both sides of the machine frame, which has outer gearing teeth for the positive rotational engagement of single part chain wheels, which can be removed from the drive shaft, whereby the drive shaft has outer toothed gearing along its longitudinal region, which comprises a central outer toothed section extending with axial distance from both sides of a vertical conveyor central line to near each bearing housing such that both the chain wheels of a double inboard chain conveyor belt and also the chain wheels of a double outer chain conveyor belt can be positioned on this outer toothed drive shaft.

2. A drive shaft with at least one chain wheel for the drive of scraper chain conveyors, for underground mining operations, with a through drive shaft mounted in bearings on both sides of the machine frame, which has outer gearing teeth for the positive rotational engagement of single part chain wheels, which can be removed from the drive shaft, whereby the drive shaft has outer toothed gearing along its longitudinal region, which comprises two outer toothed sections extending with axial distance from both sides of a vertical conveyor centre line to near each bearing housing such that both the chain wheels of a double inboard chain conveyor belt and also the chain wheels of a double outer chain conveyor belt can be positioned on this outer toothed drive shaft.

3. A drive shaft according to claim 1 or claim 2, in which the chain wheel for the double inboard chain conveyor belt comprises two identical chain wheels.

4. A drive shaft according to claim 3, in which the chain wheels of the double outer chain conveyor belt correspond to the chain wheels of the double inboard chain conveyor belt.

5. A drive shaft according to claim 1 or claim 2, in which the chain wheels are set to a prescribed separation distance for the double inboard chain conveyor belt and the double outer chain conveyor belt by means of distance sleeves.

6. A drive shaft according to the claim 5, in which the distance sleeves comprise a central sleeve and two outer sleeves.

7. A drive shaft according to claim 6, in which the chain wheels and the outer sleeves are provided with axial borings and the central sleeve with corresponding threaded blind hole borings.

8. A drive shaft according to one of the claim 6, in which the outer sleeves have a radial distance collar in their region near to the conveyor on the inside of the outer sleeves.

9. A drive shaft according to claim 6, in which the outer sleeves have a circulating recess in their region near to the conveyor on the inside of the outer sleeves.

10. A drive shaft according to claim 1 or claim 2, in which the drive shaft has a reduced diameter in the region close to the bearing in each case.

11. A drive shaft according to claim 1 or claim 2, in which the drive shaft is connected on its drive side with a curved tooth coupling.

12. A drive shaft according to claim 1 or claim 2, in which the chain wheel of the double inboard chain conveyor belt comprises a single part chain wheel.

13. A drive shaft according to claim 12, in which the chain wheel is fixed axially by two outer sleeves.

14. A drive shaft according to claim 12, in which the chain wheel is provided with threaded blind hole borings.

* * * * *